Patented Aug. 20, 1940

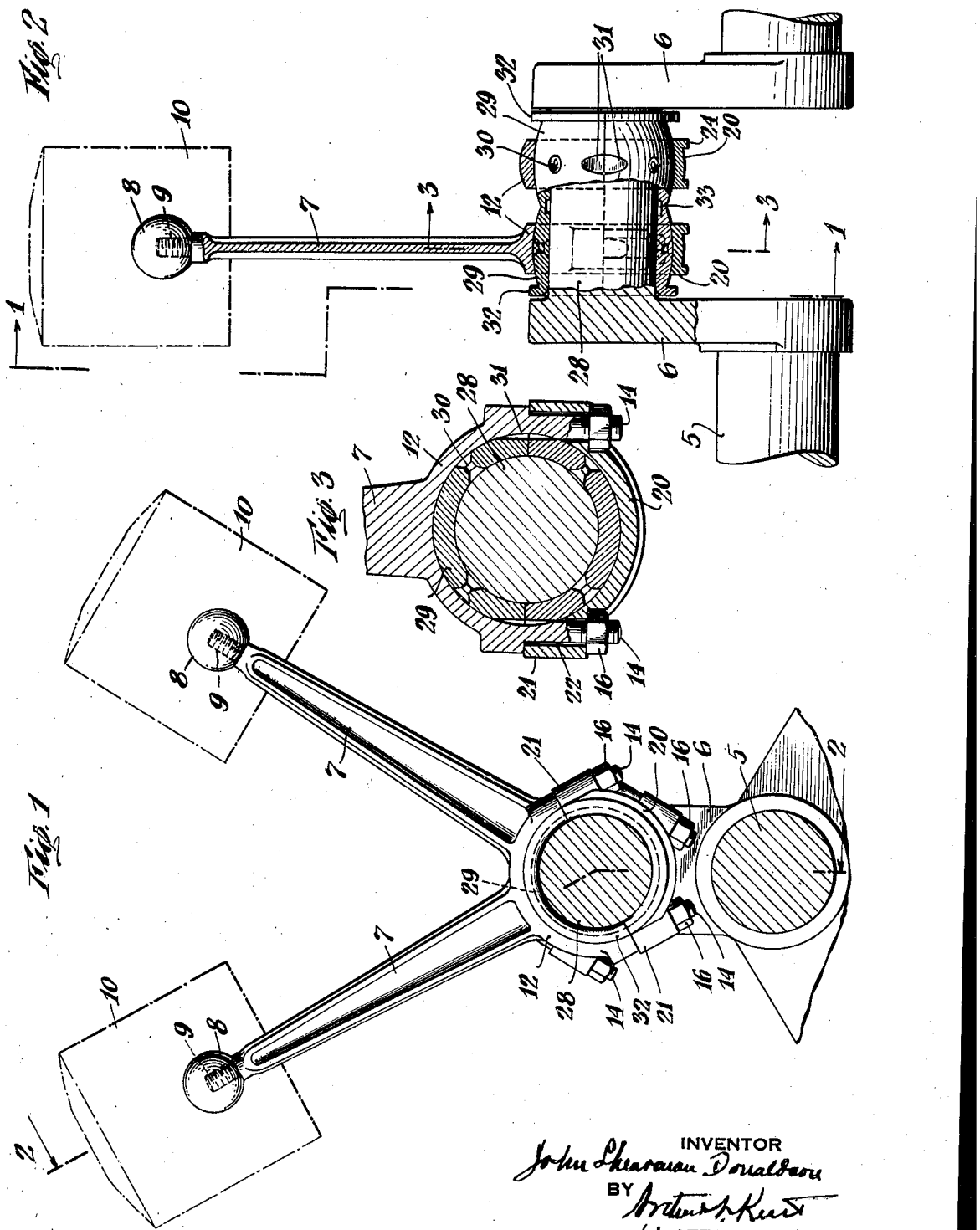

2,212,366

UNITED STATES PATENT OFFICE 2,212,366

PISTON ROD BEARING

John Shearman Donaldson, St. Albans, N. Y., assignor to Donaldson Piston Corporation, New York, N. Y., a corporation of New Jersey Application February 8, 1938, Serial No. 189,329

1 Claim. (Cl. 308—67)

This invention relates to piston rod bearings, and more particularly to such bearings for use in internal combustion engines.

The bearings by which piston connecting rods are connected to crank-shafts have been made heretofore with cylindrical bearing surfaces on the two relatively movable members, and these cylindrical bearing surfaces, because of the great pressures and rapid movement to which they are subjected, are made as large as practical in both circumference and width. It has been necessary, therefore, in order to avoid binding and uneven wear of the bearings, to have the crank-shaft very accurately positioned longitudinally with relation to the pistons, and considerable difficulty has been experienced from movement of crank-shafts due to wear of the shaft bearings.

The object of the present invention is to provide piston connecting rod bearings which avoid the necessity of accurate relative positioning of crank-shafts and pistons longitudinally of the shaft, and avoid trouble resulting from slight longitudinal movement of the crank-shaft after use; and, further, to provide bearings which are safe in operation and have a long life.

To these ends, the bearing surfaces of the connecting rods at their crank engaging ends are made concave and lie along the zones of spheres which zones extend on opposite sides of planes passing through the centers of the spheres; and the crank pins are provided with bearing surfaces which are convex and lie along similar zones of spheres of the same size or substantially the same size as the bearing surfaces of the piston rods, and the parts having these spherically curved bearing surfaces are so formed as to permit a limited relative movement between the pistons and the crank-shaft longitudinally of the shaft, the bearings thus forming a universal joint. To avoid binding at the bearing between the piston end of the connecting rod and the piston and cocking of the piston as a result of longitudinal displacement of the crank-shaft, the piston bearing is also a suitable universal joint bearing. Most desirably, this bearing is a ball and socket bearing, the connecting rod having a ball on its end which seats in a spherically curved bearing carried by the piston. The invention has been made especially with the idea of providing a connecting rod crank bearing whereby full advantage of the connecting rod ball and socket piston bearing may be obtained.

The invention will be understood from the following description of an approved embodiment thereof in connection with the accompanying drawing, in which:

Fig. 1 is a section along the line 1—1 of Fig. 2;

Fig. 2 is a section along the line 2—2 of Fig. 1; and

Fig. 3 is a section on a somewhat enlarged scale along the line 3—3 of Fig. 2.

In the drawing, reference character 5 indicates a portion of a crank-shaft for an internal combustion engine, and reference character 6 indicates one of the cranks thereof. Two connecting rods 7 are shown extending at an angle to each other, and both connected to the pin or wrist 28 of the crank 6, although only one connecting rod or more may be used for each crank.

Each of the connecting rods 7 has a spherically shaped bearing head 8 at its piston end. Pistons 10 are indicated by dotted lines in the drawing which have spherically shaped bearings for the heads 8 of the rods, but it is not necessary to describe such bearing members as they are already known and constitute no part of the present invention. Such ball and socket bearings are shown, for example, in my Patent No. 1,904,126. The connecting rods may be connected to their pistons 10 in any other suitable way which will provide a universal joint, permitting the rods to move in planes passing through the shaft axis and parallel therewith.

Each connecting rod has at its crank end a bearing ring formed by an integral semi-circular bearing portion 12 from each end of which extends a stud 14, which may be integral therewith, and a removable semi-circular bearing portion 20 which has lugs 21 at its ends with holes 22 therethrough for the studs 14 which are threaded for nuts 16 by which the part 20 is secured to the part 12.

The inner or bearing surfaces of the bearing ring portions 12 and 20 are concave and lie along the surface of a zone of a sphere, which zone extends on opposite sides of a plane passing through the center of the sphere and preferably extends equally on opposite sides of such a plane. the crank pin or wrist 28 is cylindrical and has a split bearing sleeve 29 thereon which provides bearing surfaces for the two connecting rods, the sleeve being most desirably rotatable on the crank pin.

For each of the connecting rods the bearing sleeve 29 has a convex bearing surface spherically curved to fit the concave bearing surface of the rod, each of said convex surfaces lying along the surface of a zone of a sphere that extends preferably equally on opposite sides of a plane passing through the center of the sphere, and these bearing surfaces of the sleeve 29 are wider than the concave bearing surfaces of the rods. The concavely curved bearing surface of the end ring of each connecting rod will thus fit a convexly curved bearing surface of the sleeve 29. The bearings thus formed will be universal bearings which provide not only for rotary movement of the sleeve 29 and crank pin with respect to the ends of the connecting rods but also permit the connecting rods to be inclined to a limited degree to a plane perpendicular to the axis of the crank shaft. When, as shown, the bearing sleeve 29 is a floating sleeve, that is, when it is free to rotate relatively to both the crank pin and the connecting rod rings, a limited turning of the connecting rods around their own axes will also be permitted.

With such a crank bearing and with a ball and socket bearing at the piston end of the connecting rods as shown, or other suitable bearing providing a universal joint between the rod and the piston, the crank shaft, as will be apparent, need not, in order to avoid binding of either the crank bearings or the piston bearings or cocking of the pistons, be accurately positioned longitudinally with relation to the pistons.

As shown, and desirably in order to keep down the outside diameter of the bearing ring of the connecting rod, the space between the studs 14 is less than the inner diameter of the bearing ring. The bearing sleeve 29, therefore, has diametrically opposite grooves 31 in its outer surface to permit it to be passed between the lugs in placing it in position against the ring part 12 and in removing it. The bearing sleeve has desirably the usual oil holes 30, end flanges 32, and one or more inside oil grooves 33. It may be made up of a plurality of parts providing an inner sleeve and outer sleeves or rings providing the convex bearing surfaces, thus providing additional lubricated sliding surfaces between connecting rods and crank pin.

As there is only relatively small movement between the end of the connecting rod and the piston, sufficient bearing surface is provided with a relatively small ball and socket, and this is of advantage in saving weight of reciprocating parts of the engine. The continuously revolving crank bearings, on the other hand, can be of ample area so as to reduce the rate of wear under the relatively large relative movement of their bearing surfaces.

What is claimed is:

A bearing between a crank shaft and a connecting rod, comprising a bearing ring at the end of the connecting rod formed by a semi-circular portion carried by the rod having a threaded stud extending from each end thereof and a removable semi-circular portion the ends of which are formed to receive said studs and which is secured in place by nuts on the ends of the studs, the inner surface of the bearing ring being shaped to provide a concave spherically curved bearing surface the greatest diameter of which is greater than the distance between said studs; and a bearing member on the crank having a convex spherically curved bearing surface fitting the bearing surface of the connecting rod and having diametrically opposite grooves to permit said bearing member to pass between said studs in assembling the parts.

JOHN SHEARMAN DONALDSON.